Nov. 23, 1937.  A. N. PORTER  2,099,942

SPRING SHACKLE

Filed Oct. 5, 1936

INVENTOR
Albert N. Porter.
BY
ATTORNEY

Patented Nov. 23, 1937

2,099,942

UNITED STATES PATENT OFFICE 2,099,942

SPRING SHACKLE

Albert N. Porter, Tulsa, Okla., assignor to J. F. Darby, Tulsa, Okla.

Application October 5, 1936, Serial No. 103,958

2 Claims. (Cl. 267—54)

This invention relates to spring shackles, particularly those of oil-less type, and has for its principal objects to provide a shackle of this character having pivotal knife edge support for loads acting thereon; and to provide means for retaining the knife edge portions of the shackle bearings in contact with their seats during flexure of the springs and movement of the vehicle frame connected by the shackle.

Other important objects of the invention are to provide a shackle construction that is readily assembled; and to provide a shackle and shackle bearings equipped with inserts formed of hard, wear resisting material so that the shackle may be constructed of a material having high tensile strength and capable of withstanding torsional strains imparted to the shackles.

In accomplishing these and other objects of the invention, as hereinafter pointed out, I have provided improved details of structure, the preferred form of which is illustrated in the accompanying drawing, wherein.

Figure 1:
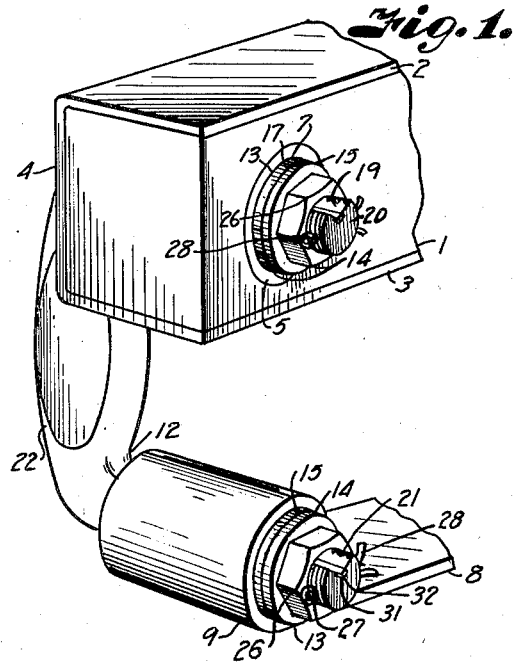
Fig. 1 is a perspective view of a portion of a vehicle frame and spring connected by a shackle constructed in accordance with the present invention.

Referring more in detail to the drawing:

1 designates a portion of a conventional vehicle frame ordinarily formed of channels having upper and lower flanges 2 and 3 connected by a vertical web 4. Secured within the flanges at the desired points to mount the spring shackles are bearing blocks 5 having transverse cylindrical openings 6 to mount a shackle bushing 7. 8 designates a spring having a rolled end 9 to form a cylindrical bearing opening 10 for a bushing 11 that cooperates with the bushing 7 in mounting a spring shackle 12.

The bearing bushings 7 and 11 are of identical construction, each being formed of a pair of semicylindrical sections 13 and 14 of suitable diameter to be pressed within the respective bearing openings and provided with stop flanges 15 to engage the inner ends of the bearing block 5 and the rolled portion 9 of the spring respectively.

Figure 2:
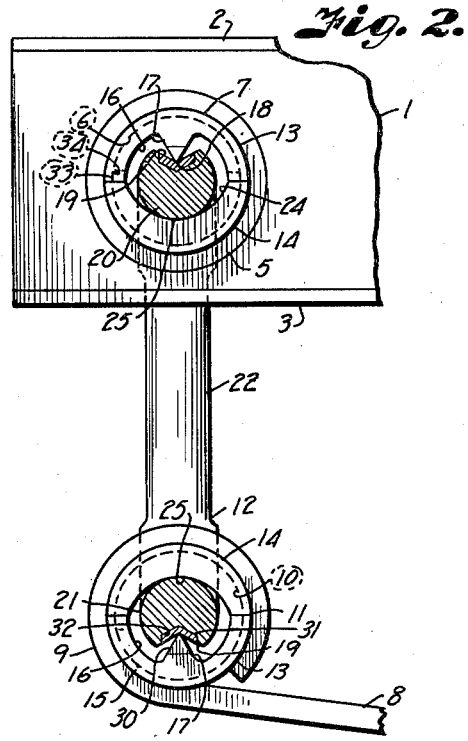
Fig. 2 is a side elevational view of the structure illustrated in Fig. 1.
Figure 3:
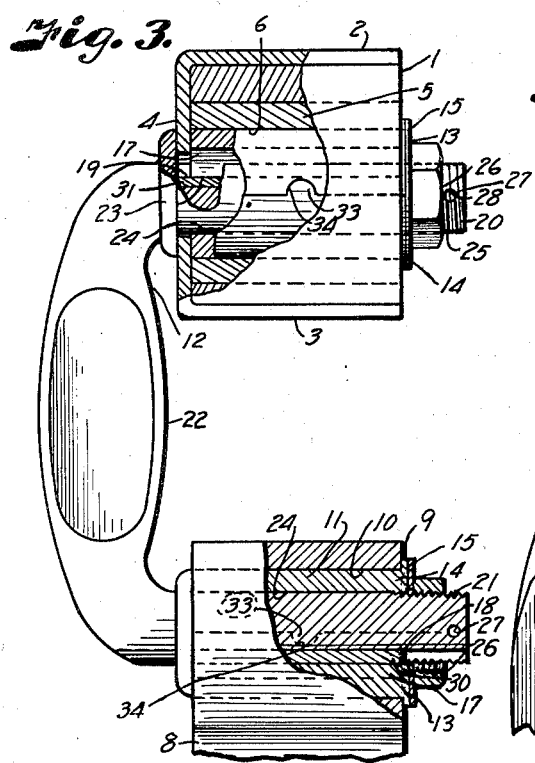
Fig. 3 is an end view showing parts of the shackle bearings and adjacent supporting structure in section to better illustrate their construction.
Figure 4:
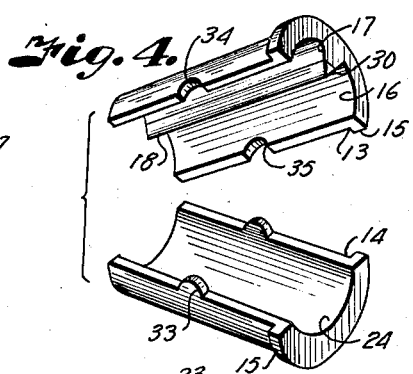
Fig. 4 is a detail perspective view of one of the shackle bearing bushings, the sections of which are shown in spaced relation to better illustrate their construction.
Figure 5:
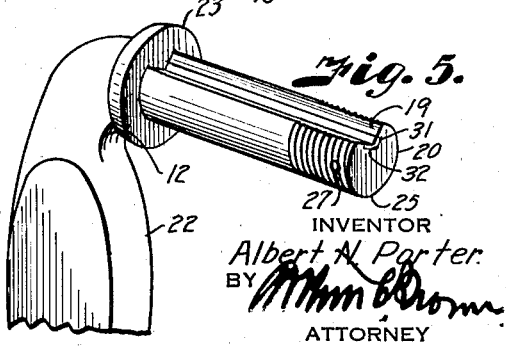
Fig. 5 is a perspective view of one of the shank portions of the shackle, particularly illustrating the knife edge seat therein.

The bushing sections 13 have substantially semicylindrical inner faces 16 concentric with the bushing and provided with centrally arranged, longitudinal ribs 17 of V-shaped cross-section to provide knife edge bearing portions 18. The ribs extend inwardly of the bushing toward the axis thereof to engage in V-shaped seats 19 formed in cylindrical shanks 20 and 21 of the shackle 12, the shanks of the shackle being connected by a bar portion 22 having suitable length to properly space the spring from the vehicle frame as shown in Figs. 1, 2 and 3, and provided with flanged collars 23. The seats are respectively arranged on the opposite sides of the shanks and the shanks are of smaller diameter than the inner diameter of the bushing sections 13 to allow rocking movement of the shanks relatively to the knife edge bearings 18.

The other bushing sections 14 have their inner faces 24 eccentrically related to the outer circumference of the sections, with the axis thereof located in coincidence with the knife edge bearing portion 18 of the ribs 17 when the bushings are assembled for insertion into the bearing openings, as best shown in Fig. 2. The diameter of the shackle shanks are such that when the knife edge bearing portions 18 of the bushing sections are engaged in the V-shaped seats the diametrically opposite faces 25 of the bearing shanks slidingly engage the inner faces 24 of the bushings 13 to thereby permit rocking movement of the shackles on the knife edge bearings but to eliminate lost motion in their radial directions.

The shanks of the shackles are of suitable length to project from the flanged ends of the bushings to accommodate nuts 26 that are threaded thereon to cooperate with the collars 23 in limiting longitudinal play of the shanks relatively to the bearing bushings. The ends of the shanks are also provided with transverse openings 27 to mount cotter pins 28 which when applied retain the lock nuts from threading off the shanks.

In order that the knife edges as well as the V-shaped seats may be formed of hard, wear resisting material, and to permit the shackle and bearing bushings to be formed of high tensile strength material, the knife edges are preferably formed on inserts 30 constructed of the wear resisting material and welded or otherwise secured to the ribs. The shanks of the shackle are likewise provided with hardened, V-shaped inserts 31 inset within grooves 32 provided in the shackle as best shown in Fig. 2.

In order to prevent independent movement of the bushing sections, one of the sections, for example the section 14, is provided with tongs 33 on the sides engaging in recesses 34 and 35 in the other section.

In assembling a shackle of the character decribed the bushing sections are first assembled and then pressed within the bearing openings in such a position that the knife edge bearing portions 18 are located in the same plane and in facing relation with each other as shown in Fig. 2, after which the shanks of the shackles are projected through the bushings so that the V-shaped seats thereof engage the knife edge bearings. The nuts 26 and cotter pins 28 are then applied for securing the shackles as shown in Fig. 1.

During flexure of the spring responsive to road irregularities, the knife edge bearings pivot within the bottom of the V-shaped bearings of the shackle to allow for pivotal movement of the shackle and elongation of the spring responsive to flexure thereof as in accordance with conventional springs. Since the shanks of the shackles rockingly engage the inner face of the bushings 14 the knife edges are retained in contact with their seats during sudden movements of the spring or body in directions tending to lift the knife edges from their respective seats.

From the foregoing it is obvious that I have provided a shackle structure which does not require use of a lubricant since there is no frictional moving contact of the parts of the shackle bearings under load. Also since the knife edges rock in fixed line contact with the shackle there is no tendency to produce squeaks and similar noises.

What I claim and desire to secure by Letters Patent is:

1. A spring shackle including a U-member having parallel shanks provided with V-shaped longitudinal grooves forming knife edge bearing seats, collars on the shanks, bushings loosely engaged over said shanks and having ribs provided with knife edge bearings for engaging in said seats, and means cooperating with the collars to retain the bushings.

2. A spring shackle including a U-member having spaced parallel shanks provided with threaded terminal ends and having longitudinal grooves forming knife edge bearing seats in said shanks, collars on the shanks, bushings engaging the shanks and having ribs provided with knife edge bearing portions for engaging in said seats, washers on said shanks, and nuts mounted on the threaded ends of the shanks and engaging the washers for cooperating with the collars to retain the bushings in cooperative engagement with the U-member.

ALBERT N. PORTER.